Figure 1:
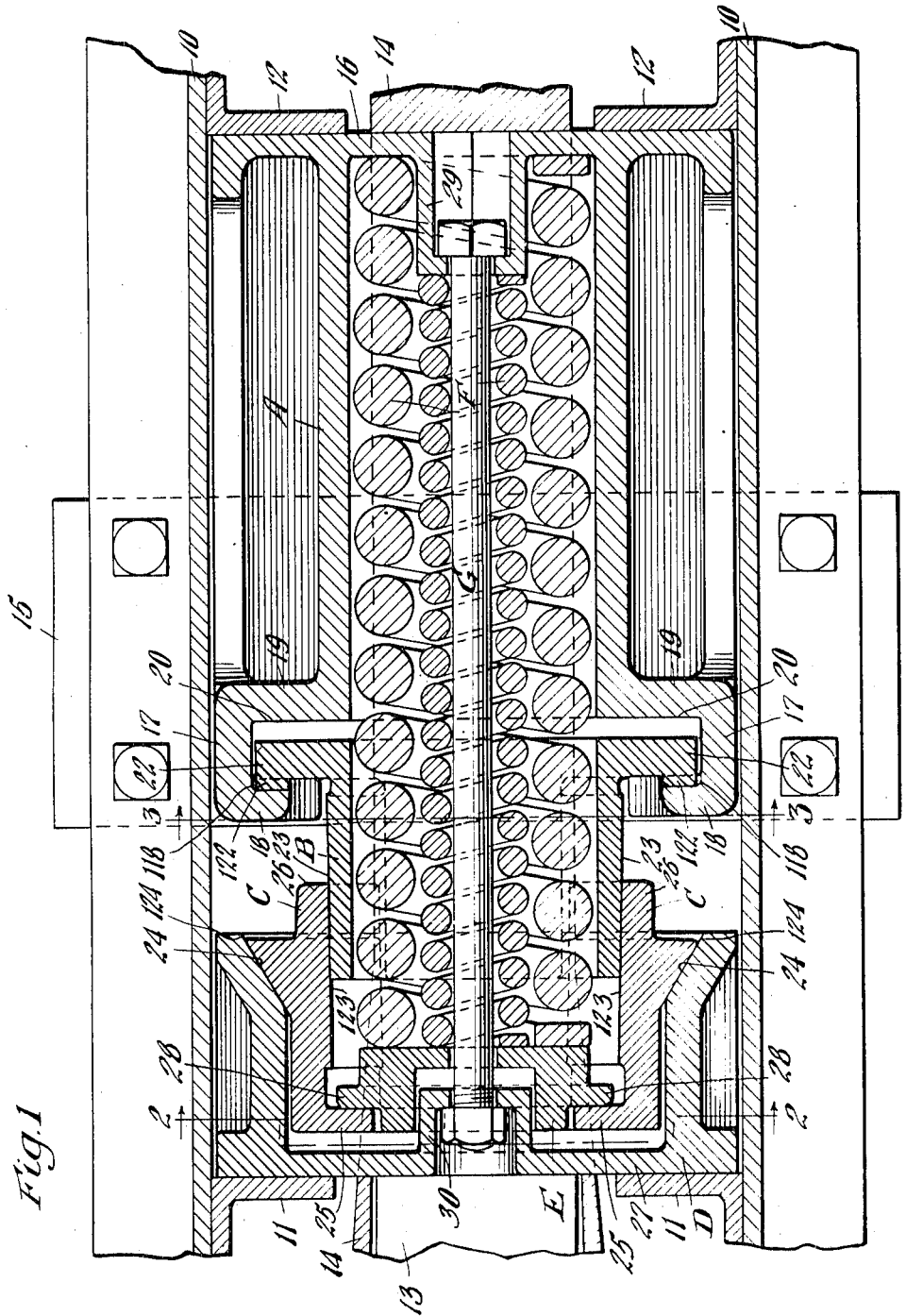

Aug. 23, 1927.

J. F. O'CONNOR 1,640,211

FRICTION SHOCK ABSORBING MECHANISM

Filed Jan. 8, 1925   2 Sheets-Sheet 1

Witnesses

Wm. Geiger

Inventor
John F. O'Connor
By George I. Haight
His Atty.

Aug. 23, 1927.　　　　　J. F. O'CONNOR　　　　　1,640,211
FRICTION SHOCK ABSORBING MECHANISM
Filed Jan. 8, 1925　　　2 Sheets-Sheet 2
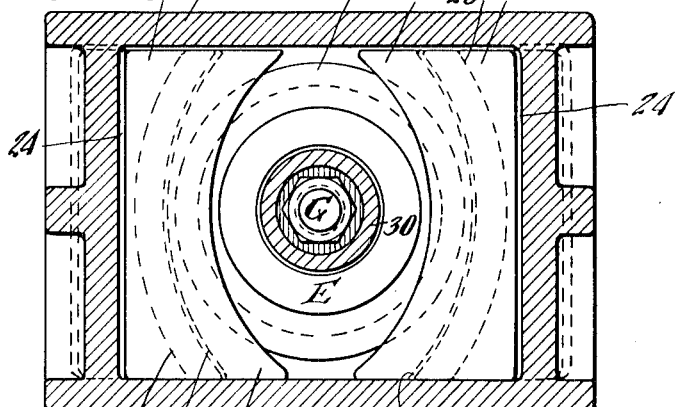
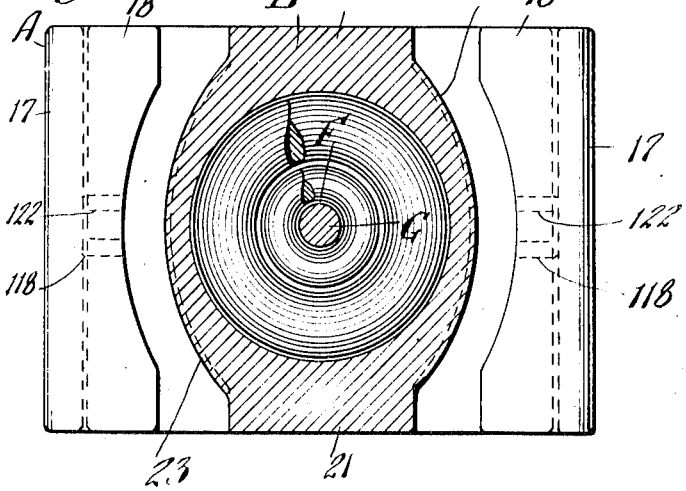
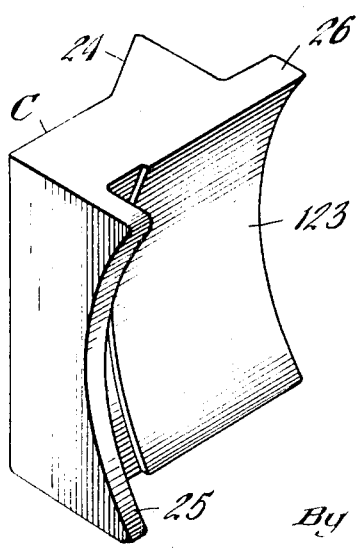
Witnesses
Wm Geiger
Inventor
John F. O'Connor
By George I Haight
His Atty.

Patented Aug. 23, 1927.

1,640,211

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 8, 1925. Serial No. 1,139.

This invention relates to improvements in friction shock absorbing mechanisms.

One object of the invention is to provide a high capacity friction shock absorbing mechanism having preliminary spring action.

Another object of the invention is to provide a mechanism of the character indicated, especially adapted for railway draft riggings, including a main spring resistance, a plurality of friction elements and a cooperating friction means, wherein the friction means and elements are arranged to move as a unit during a predetermined portion of the compression stroke of the mechanism, the shocks at that time being absorbed entirely by the main spring resistance.

A more specific object of the invention is to provide a friction shock absorbing mechanism, including a plurality of friction shoes and a cooperating friction post, wherein the mechanism is so designed and the parts so arranged that a main spring resistance of great length and high capacity may be accommodated by the mechanism.

A still further object of the invention is to provide a friction shock absorbing mechanism including a friction post and a plurality of spring resisted friction shoes cooperating therewith, wherein the post is adapted for limited movement during the compression of the mechanism to provide for a purely spring resistance during a predetermined preliminary portion of the compression stroke.

Still another object of the invention is to provide a friction shock absorbing mechanism embodying a friction post and a plurality of cooperating friction elements, the arrangement being such that there is an initial movement in unison of the post and elements to absorb the lighter shocks and a subsequent relative movement of the friction elements and the post to absorb the heavier shocks.

Other objects and advantages of the invention will more fully and clearly appear from the description and claims hereinafter following.

In the drawings forming a part of this specification, Figure 1 is a longitudinal, horizontal, sectional view of a portion of a railway draft rigging showing my improvements in connection therewith. Figures 2 and 3 are vertical, transverse, sectional views corresponding substantially to the lines 2—2 and 3—3, respectively, of Figure 1. And Figure 4 is a detailed, perspective view of one of the friction shoes employed in connection with my improved mechanism.

In said drawings, 10—10 denote the usual channel-shaped center or draft sills of a railway car underframe, to the inner faces of which are secured front stop lugs 11—11 and rear stop lugs 12—12 of usual construction. A portion of the draw bar is shown at 13, the same having operatively connected thereto a hooded yoke 14 of well-known form, and within which is disposed the shock absorbing mechanism proper, hereinafter described in detail. The yoke and parts contained therewithin are supported in operative position by a detachable saddle plate 15.

The improved shock absorbing mechanism, as shown, comprises, broadly, a spring cage A; a friction post B; a pair of friction shoes C—C; a front follower casing D; a spring follower E; a main spring resistance F; and a retainer bolt G.

The spring cage A is provided with a transverse rear wall 16 adapted to cooperate with the rear stop lugs 12 in the manner of the usual rear follower. At the forward end, the spring cage has laterally offset side walls 17—17 terminating at the outer end in inwardly projecting flanges 18—18. The offset walls 17 are connected to the main body portion of the cage A by transversely extending, vertically disposed walls 19—19 presenting transverse abutment faces 20 spaced rearwardly from the flanges 18.

The friction post B, which is of generally cylindrical form, as clearly shown in Figures 1 and 3, has thickened portions at the upper and lower sides thereof designated by 21 to provide proper column strength. At the rear end the post B is provided with a pair of laterally extending flanges 22 adapted to be accommodated between the flanges 18 and the transverse abutment shoulders 20 of the spring cage. The arrangement is such that the flanges 22 are insertible in a vertical direction between the flanges 18 and the abutment surfaces 20, and the spacing of the flanges and abutment faces is so designed as to permit a predetermined amount of motion between the post and the cage. The flanges 22 of the post and the flanges 18 of the spring cage are preferably provided with interengaging means in the form of a lug 122 on each flange 22 engaging within a socket 118 in the corresponding flange 18 of the shell, to assist in preventing relative lateral movement of the shell and cage when the former is in the projected position. At the opposite sides the post B is provided with outer, true cylindrical friction surfaces 23, diverging rearwardly of the mechanism as clearly shown in Figure 1. The post is hollow to freely accommodate the main spring resistance, and the opening therethrough coresponds in cross-section to the cross-section of the interior of the spring cage A. The bore of the spring cage as well as the opening in the post is preferably of circular cross-section so as to correspond to the formation of the helical outer coil of the main spring resistance F.

The friction shoes C are two in number and are disposed at the opposite sides of the mechanism. Each of the shoes C is preferably in the form of a casting and is adapted to cooperate with the corresponding friction surface 23 of the post. As clearly shown in Figures 1 and 4, each shoe is provided with a wedge face 24 at the outer side, a cylindrical friction surface 123 at the inner side and an inwardly projecting flange 25 at the forward end thereof. To permit full movement of the friction shoes during the compression stroke of the mechanism, the inner ends of the shoes are cut away, thereby leaving rearward extensions 26 which are adapted to enter between the inner edges of the flanges 18 and the corresponding sides of the friction post.

The front follower casing D is preferably of substantially rectangular box-like form having a transverse, vertical end wall 27 adapted to cooperate with the front stop lugs 11 in the manner of the usual front follower. The side walls of the follower casing D have rearwardly diverging wedge faces 124 at the inner ends thereof, adapted to cooperate with the wedge faces 24 of the friction shoes C. The parts are so proportioned that the inner end of the front follower casing D is normally spaced such a distance from the outer or front end of the spring cage A that the same will abut when the mechanism is fully compressed, the front follower casing and the spring cage together acting as a column to transmit the load directly to the stop lugs on the draft sills.

The spring follower E is in the form of a relatively heavy disc provided with an annular flange 28 adjacent the front end thereof, adapted to bear on the inner surfaces of the flanges 25 of the friction shoes C. At the forward end the spring follower E is reduced in diameter, thereby providing an annular projection extending between the flanges 25 of the shoes C, a slight clearance being left between the annular projection and inner edges of the flanges 25.

The main spring resistance element F comprises a relatively heavy outer coil and a relatively lighter inner coil, the outer coil having its opposite ends bearing on the spring follower E and the rear wall 16 of the cage A, respectively, and the inner coil having its opposite ends bearing respectively on the spring follower and a hollow boss 29 extending inwardly from the rear wall 16 of the cage A. The spring resistance E, as clearly shown in Figure 1, is of unusual length, extending substantially from one end of the gear to the other, thereby providing a spring of extraordinary capacity for this type of gear. In addition to functioning as a resistance element, the spring F also serves to hold the hollow friction post or shell assembled with the spring cage, in that the front end of the spring extends into and through the hollow post effectively preventing lateral movement thereof with respect to the spring cage.

The parts are maintained of uniform overall length and under initial compression by the retainer bolt G, which has its rear end anchored to the boss 29 of the casing A and its front end anchored to an inwardly extending boss 30 on the front follower casing D. As will be seen upon reference to Figure 1, the spring follower E is suitably recessed to accommodate the boss 30, a certain amount of clearance being left between the inner end of the lug and the bottom wall of the recess in the spring follower to permit a certain amount of outward movement of the spring follower. The front end of the spring follower, as well as the front ends of the shoes C, are also spaced from the inner surface of the end wall 27 of the front follower casing to permit outward movement of these parts so as to compensate for wear on the wedge and friction surfaces of the device.

Assuming a buffing or compression action applied to the mechanism, the operation is as follows: As the front follower casing D is moved inwardly, a wedging action will be set up between the follower and the friction wedge shoes C, forcing the latter firmly against the friction surfaces of the post B. As the follower D moves inwardly, the main spring resistance F will be compressed between the spring follower E and the rear wall of the spring cage A. At the same time the friction post will be carried rearwardly in unison with the friction shoes C. This action will continue until the flanges 22 of the post come into abutment with the transverse abutment faces 20 of the spring cage A, whereupon rearward movement of the post will be arrested and the shoes C will be forced to slip on the friction surfaces 23 of the post. Due to this action, the resistance offered will be greatly augmented. A differential action will also be effected, due to the diverging relation of the friction surfaces of the post, the shoes C being forced to travel rearwardly at a faster rate than the front follower D. Inward movement of the front follower will finally be arrested by engagement thereof with the outer end of the spring cage as hereinbefore described, thereby preventing the spring resistance element from being driven solid.

Upon removal of the actuating or compression force, the initial action will be an outward movement of the friction post in unison with the friction shoes, due to the tight frictional contact between the cooperating friction surfaces thereof. This movement will continue until the post is arrested by engagement of the flanges 22 thereof with the inner faces of the flanges 18 of the cage A, whereupon the shoes, together with front follower, will be forced outwardly with reference to the spring cage A and the post B. The parts will thus all be restored to normal position, relative separation of the front follower casing D and the spring cage A being limited by the retainer bolt G.

With the arrangement above described, it will be evident that a comparatively light preliminary spring action is obtained, to absorb the lighter shocks and a relatively heavy friction resistance is thereafter had to absorb the heavier shocks. It will also be evident that by providing a hollow friction post through which the main spring resistance extends and providing means at the outer ends of the friction shoes to cooperate with the spring follower, it is possible to employ a spring of maximum overall length and of exceedingly high capacity. It will further be evident that the connection between the friction post and the spring cage casting is such as to render the post readily removable so that the same may be easily renewed and the cost of repairs thus minimized.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with relatively movable follower-acting means; of a central friction post having a lost motion connection with one of said followers permitting limited movement of the post with reference to said follower means to provide for preliminary spring action; a plurality of friction shoes cooperating with said friction post, said shoes and the other follower-acting means having cooperating wedge faces; and a main spring resistance interposed between said shoes and follower means to which the friction post is anchored.

2. In a friction shock absorbing mechanism, the combination with a main follower; of a friction element having longitudinally disposed friction surfaces, said friction element having a lost motion connection with said follower; a plurality of friction shoes; a centrally disposed main spring resistance cooperating with said shoes; a movable wedge pressure transmitting member cooperating with said shoes to force the same against the friction surfaces of said element and effect movement of the latter and said shoes inwardly of the mechanism as a unit during the initial portion of the compression stroke; and means for limiting the inward movement of said element after a predetermined portion of said compression stroke, whereby said shoes will be forced to move relatively to said friction element.

3. In a friction shock absorbing mechanism, the combination with a spring cage; of a hollow friction element having means thereon for anchoring the same to the cage, said means permitting limited relative longitudinal movement with reference to the cage; friction wedge shoes cooperating with the friction element; wedge pressure transmitting means cooperating with the friction shoes; and a main spring disposed within the spring cage, said spring being continuous and extending into the friction element to prevent relative lateral displacement of the element and cage to maintain the friction element assembled with the spring cage, said spring engaging the shoes and resisting inward movement of the latter.

4. In a friction shock absorbing mechanism, the combination with a spring casing having an end wall with an opening therein, said casing being provided with sets of spaced shoulders adjacent said opening on the outer side of said wall; of a hollow friction element having laterally extended shoulders on the opposite sides thereof, said element being adapted to be assembled with said casing by moving the element transversely of the casing with the shoulders of said element between said sets of spaced shoulders of the casing, the shoulders of said element being of less thickness than the space between the shoulders of each set of the casing to thereby permit said element to move relatively toward and from said end wall of the casing; friction elements cooperating with said element; and spring means disposed within said casing normally extending through said end wall opening of the spring casing into the interior of the adjacent end of said element and bridging the space between the said end wall and shell, said spring means preventing accidental movement of the element transversely relatively to the casing.

5. In a friction shock absorbing mechanism, the combination with a spring casing open at one end thereof; of a hollow friction element disposed at said open end of the casing; cooperating transverse shoulders on said element and casing permitting said element to be assembled with the casing by a movement of said element transversely of the casing, said shoulders being spaced apart longitudinally in the normal position of the parts, thereby adapting the element for a limited amount of movement with respect to the casing; friction members co-operating with said element; and a continuous spring disposed within the casing extending through the open end of the latter and into said hollow element, said spring preventing lateral disengagement of said element and casing.

6. In a friction shock absorbing mechanism, the combination with a spring cage; of a friction member having limited relative movement with reference to the spring cage; friction elements on one side of said friction member, said elements and member having cooperating friction surfaces; a main spring resistance within said spring cage, said spring resistance being disposed on the other side of said friction member; and pressure transmitting means, said pressure transmitting means and friction elements having co-operating wedge faces.

7. In a friction shock absorbing mechanism, the combination with a spring cage casting; of a detachable friction post, said post being hollow, and said post and cage having interengaging holding means thereon for detachably connecting the post to the cage, permitting the cage and post to be assembled by relative lateral movement thereof and limiting outward longitudinal movement of the cage and post when assembled; a friction wedge system co-operating with the post; and a spring resistance within the spring cage co-operating with the wedge system, said spring resistance extending into the hollow portion of the post, thereby preventing lateral separation of the post and cage.

In witness that I claim the foregoing I have hereunto subscribed my name this 5th day of January, 1925.

JOHN F. O'CONNOR.